US006608597B1

(12) United States Patent
Hadzoglou et al.

(10) Patent No.: US 6,608,597 B1
(45) Date of Patent: Aug. 19, 2003

(54) DUAL-BAND GLASS-MOUNTED ANTENNA

(75) Inventors: James Hadzoglou, Mayfield Heights, OH (US); Michael E. Warner, Cleveland, OH (US); Joseph Hrabak, Brook Park, OH (US)

(73) Assignee: Allen Telecom, Inc., Beachwood, OH (US)

( * ) Notice: Subject to any disclaimer, the term of this patent is extended or adjusted under 35 U.S.C. 154(b) by 0 days.

(21) Appl. No.: 09/961,653

(22) Filed: Sep. 24, 2001

(51) Int. Cl.$^7$ .................................................. A01Q 1/32

(52) U.S. Cl. ........................ 343/713; 343/715; 343/860

(58) Field of Search ................................ 343/713, 715, 343/860

(56) References Cited

U.S. PATENT DOCUMENTS

| | | | | |
|---|---|---|---|---|
| 4,238,799 | A | 12/1980 | Parfitt | 343/715 |
| 4,675,687 | A | 6/1987 | Elliott | 343/715 |
| 4,764,773 | A | 8/1988 | Larsen | 343/713 |
| 4,794,319 | A | 12/1988 | Shimazaki | 343/715 |
| 4,839,660 | A | 6/1989 | Hadzoglou | 343/715 |
| 4,857,939 | A | 8/1989 | Shimazaki | 343/715 |
| 4,860,019 | A | 8/1989 | Jiang et al. | 343/795 |
| 5,181,043 | A | 1/1993 | Cooper | 343/713 |
| 5,298,907 | A | 3/1994 | Klein | 343/715 |
| 5,343,214 | A | 8/1994 | Hadzoglou | 343/713 |
| 5,402,135 | A | 3/1995 | DeMarre | 343/715 |
| 5,451,966 | A | 9/1995 | Du et al. | 343/715 |
| 5,471,222 | A | 11/1995 | Du | 343/713 |
| 5,565,877 | A | 10/1996 | Du et al. | 343/715 |
| 5,734,355 | A | 3/1998 | Watanabe | 343/859 |
| 5,742,255 | A | 4/1998 | Afendras | 343/713 |
| 6,215,451 | B1 | 4/2001 | Hadzoglou | 343/715 |

*Primary Examiner*—Michael C. Wimer

(74) *Attorney, Agent, or Firm*—Michael Best & Friedrich LLC

(57) ABSTRACT

A dual-band antenna assembly configured to be mounted on a dielectric substrate such as an automobile window glass. The dual-band antenna assembly is adapted to transmit and receive signals in two distinct frequency bands, particularly the cellular frequency band, 800–900 MHz and the PCS frequency band 1.8 GHz. The antenna assembly is further configured to couple signals in either frequency band through the dielectric so that signals originating on a first side of the dielectric substrate may be coupled to the antenna-radiating element located on the opposite side of the dielectric substrate and signals received by the antenna on the second side of the dielectric substrate may be coupled through the dielectric to a mobile telephone located on the first side of the substrate. Thus, signals originating from a mobile telephone unit located within a vehicle may be coupled to and transmitted by an antenna element on the outside of a vehicle, and signals received by the antenna maybe coupled to the mobile telephone inside the vehicle.

15 Claims, 6 Drawing Sheets

DUAL-BAND GLASS-MOUNTED ANTENNA

FIELD OF THE INVENTION

This invention relates to antenna systems for radiotelephone communications, and more particularly, to multiple-band antenna systems usable in cellular and PCS frequency ranges and adapted for coupling through and mounting upon a glass window or other planar dielectric surface.

BACKGROUND OF THE INVENTION

Recent developments in the wireless telephone communications industry have created the need for wireless subscriber terminals or “wireless telephones” capable of operating in two widely displaced frequency ranges. In the United States, the frequency range from approximately 824 to 894 MHz (with some gaps) has been allocated for conventional “cellular” radio telephone service, and the frequency range from approximately 1850 to 1990 MHz has been allocated for “Personal Communications System” (PCS) service. Cellular systems, some of which have been in commercial operation since 1984, are relatively mature. Cellular systems provide “blanket” coverage throughout many metropolitan areas and geographically extensive coverage in many other areas where the population density or vehicular traffic are sufficient to warrant coverage.

PCS systems, on the other hand, have been developed more recently, and have a relatively small subscriber base. Some metropolitan areas do not yet have working PCS systems, and even in areas in which one or more PCS systems exist, such systems do not yet provide coverage which is as geographically extensive as that provided by mature cellular systems. As a result, a subscriber to a particular PCS system may often be in a location in which the subscriber’s PCS system is not available, but a cooperative cellular system is available. This could occur, for example, when the subscriber is located within a coverage void in a “home” region generally served by the subscribed PCS system. This could also occur when the subscriber is located outside the home region, such as in a city where the subscriber’s wireless service provider does not operate a PCS system.

In order to enable PCS system subscribers to obtain wireless telephone service in areas in which the subscribed PCS system is unavailable but a cellular system is available, wireless telephone manufacturers have developed wireless telephones capable of operation in both the cellular and PCS frequency bands. For convenient reference, the term “cellular” as applied to frequencies or frequency bands is used herein to refer to the frequency bands allocated in the United States to the Domestic Public Cellular Telecommunications Radio Service (generally, 824 to 894 MHz), and to nearby frequencies, without regard to the type of service, radio protocol standards, or technology actually in use at such frequencies. The term “PCS” as applied to frequencies or frequency bands is used herein to refer to the frequency bands allocated in the United States to Broadband Personal Communications Services (generally, 1850 to 1990 MHz), and to nearby frequencies, without regard to the type of service, radio protocol standards, or technology actually in use at such frequencies.

Hand-held wireless telephones are typically equipped with a small, flexible antenna capable of operating, to some extent, in both the cellular and PCS frequency bands. Antennas of this type are very short compared to the wavelength of the signals to be transmitted and received, and are therefore inefficient. Such antennas may be adequate when the wireless telephone is used in a location which affords a relatively short, unobstructed RF path to the base station with which communication is desired. However, when the wireless telephone is used in other locations, a better antenna is needed.

In particular, when the wireless telephone is used inside a vehicle, the structure of the vehicle both obstructs the RF path between the telephone and the base station, and scatters a substantial amount of the RF energy which would otherwise be transmitted or received by the wireless telephone. Accordingly, it is highly desirable to connect the portable telephone to an efficient antenna located on the exterior of the vehicle. This is especially important when operating in the PCS frequency band. Radio signal propagation characteristics at PCS frequencies are significantly poorer than at cellular frequencies, and the transmitter power allowed at PCS frequencies is significantly lower than the transmitter power allowed at cellular frequencies.

A popular type of antenna used in cellular and other vehicular applications is a glass-mounted or window-mounted antenna. Such antennas generally include an external portion semi-permanently affixed to the exterior surface of a vehicle window, and an internal portion semi-permanently affixed to an interior surface of the vehicle window at a position opposite the exterior portion. The interior portion is electrically connected to a suitable transmission line cable which, in turn, may be connected to the mobile telephone transceiver. The internal portion is electrically coupled to the external portion through the glass separating the two portions. The interior portion may incorporate a circuit for matching the impedance of the antenna to the impedance of the transmission line cable and for controlling the impedance of the coupling through the glass. In addition, the interior portion (or an element thereof) may function as a counterpoise.

Glass-mounted antennas are preferred in many applications because installing such antennas does not require drilling holes in an exterior vehicle surface either for use in mounting the antenna or for passing a transmission line cable from the antenna to the interior of the vehicle. This avoids problems with leakage of air and water into the vehicle, and allows the antenna to be removed from the vehicle without sealing or repairing the holes. Although temporarily installed antennas are available, many are visually obtrusive and require the transmission line cable to be passed through an existing door or window opening. As a result, the transmission line cables are often damaged.

A glass-mounted antenna generally as described above, for use at frequencies below those used in cellular and PCS communications, is disclosed in Parfitt, U.S. Pat. No. 4,238,799, which is assigned to the assignee of the present application. Glass-mounted antennas for use at cellular frequencies are disclosed in Hadzoglou, U.S. Pat. No. 4,839,660, which is assigned to the assignee of the present application, and in Larsen U.S. Pat. No. 4,764,773. It is believed that in each of these antennas, the mechanism by which coupling is achieved through the glass is primarily capacitive. Each of these antennas is designed to operate over a reasonably wide, but nonetheless limited, range of frequencies surrounding an optimum operating frequency. For example, such cellular antennas typically as cover the entire U.S. cellular frequency band.

However, none of the antennas described in the aforementioned patents are designed or optimized specifically for operation in the PCS frequency band (1850–1900 MHz). Many existing cellular through-the-glass antennas tend to perform poorly in the PCS band due to reasons such as mismatched impedances, poor coupling through the glass, and distorted radiation characteristics in the PCS frequency band. Similarly, many existing PCS antennas tend to perform poorly in the cellular band due to reasons such as mismatched impedances, for similar reasons.

Although there exist well-known techniques for modifying an existing antenna design to operate at a different frequency, such techniques often cannot be applied when the target operating frequency differs widely from the original operating frequency, because structures and materials may behave electrically in a fundamentally different manner. Moreover, even if the aforementioned antenna designs could be modified to operate at PCS frequencies, the bandwidths of the antennas are not sufficiently wide to allow them to be simultaneously adapted to operate satisfactorily at both cellular and PCS frequencies. Thus, a wireless subscriber using a "dual-band" wireless telephone in a vehicular application would be required to install two separate antennas on the vehicle.

Dual-band glass-mounted antennas for use in the 144–148 MHz and 440–450 MHz amateur radio bands have been mentioned in the sales literature of Tandy Corporation of Fort Worth, Tex. (e.g. Radio Shack part number 190-0324), and Larsen Electronics, Inc. of Vancouver, Wash. (e.g. Larsen model number KG 2/70). However, these antennas, and the structures they employ for coupling through the glass and for matching the antenna to the radio transceiver transmission line cable, are not suitable for use in the cellular and PCS frequency bands.

In addition, it is believed that these VHF/UHF antenna designs may exploit the serendipitous fact that the higher target operating frequency is almost exactly three times the lower target operating frequency. These antennas generally employ a radiator having upper and lower straight sections separated by a coiled section. The lengths of the straight sections and the parameters of the coiled section are selected such that the total radiator length is equivalent to a half wavelength at VHF. Because of the three-to-one ratio of frequencies, the developed length of the radiator consists of three half-wave sections at UHF. At VHF frequencies, the coil acts as a loading section, with the total radiator acting as a half-wavelength, unity-gain antenna. At UHF frequencies, the coil acts as a phasing element, creating a two element collinear radiator. Thus, this simple configuration works well for the 150 and 450 M Hz bands because of the three-to-one ratio of frequencies.

This approach to constructing a dual-band antenna cannot be used successfully for the CELLULAR and PCS bands because the ratio of the frequency bands is on the order of two-to-one. The two-to-one frequency ratio tends to transform the low impedances to high impedances, and conversely high impedances to low impedances, between the two bands. This factor complicates the design of a dual-band antenna because it is generally desirable that the antenna present a consistent impedance, approximately matched to the transceiver with which it is to be used, at all operating frequencies.

Moreover, existing glass-mounted VHF/UHF dual band antennas employ through-the-glass couplers and associated matching circuitry which are designed to function only with a radiator exhibiting similar base impedances in both frequency bands. Thus, even if the wireless telephone transceiver could tolerate the widely disparate base impedances exhibited by prior art radiators when used on frequency bands having a two-to-one ratio, these radiators could not be used with prior art through-the-glass couplers.

BRIEF DESCRIPTION OF THE DRAWINGS

These and other features of this invention will be best understood by reference to the following detailed description of a preferred embodiment of the invention, taken in conjunction with the accompanying drawings, in which.

DETAILED DESCRIPTION OF THE INVENTION

Figure 1:
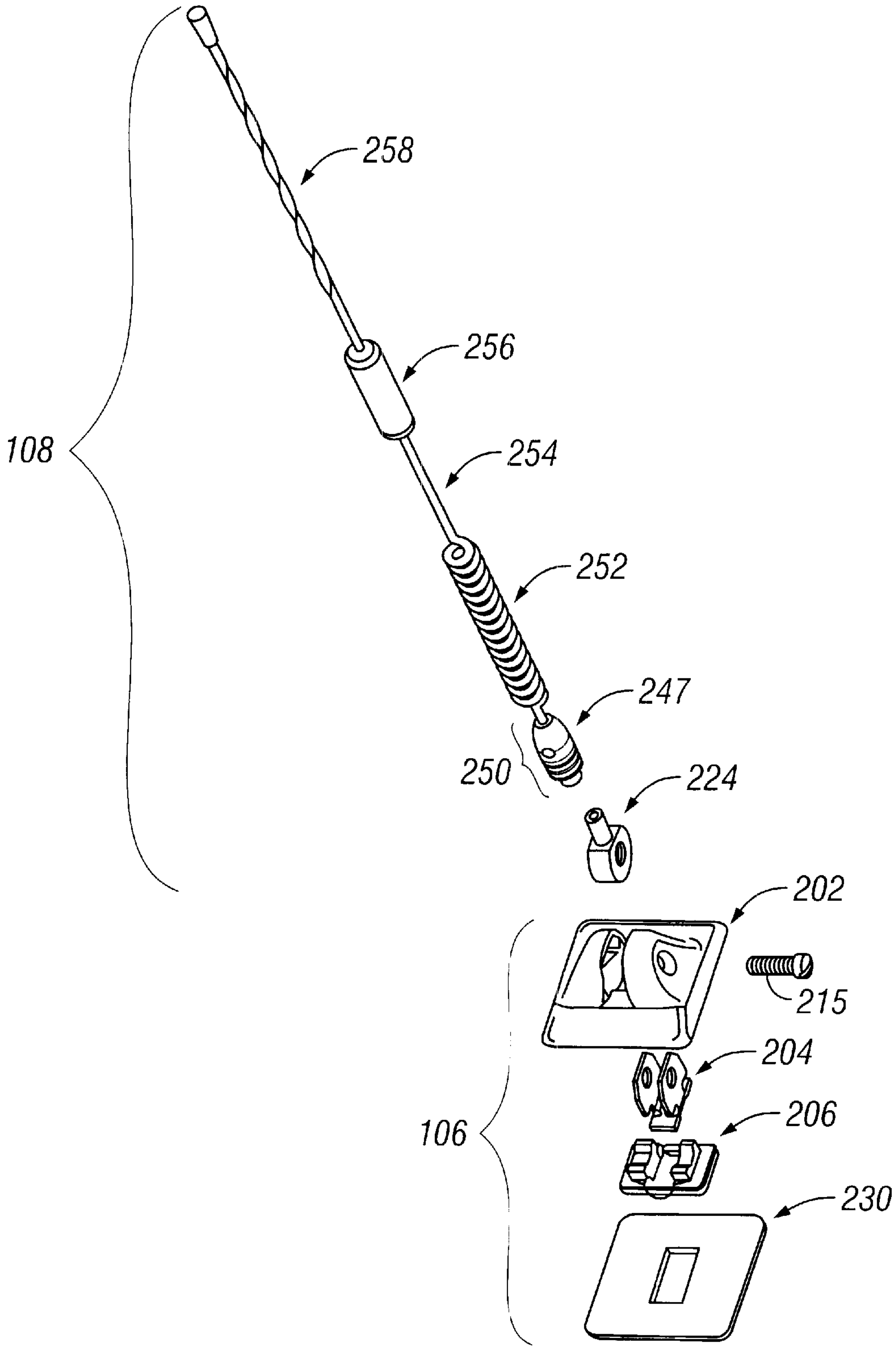
FIG. 1 is a partially exploded perspective view of an antenna constructed according to the present invention.

The present invention relates to a dual-band antenna assembly configured to be mounted on a dielectric substrate such as an automobile window glass. The dual-band antenna assembly is adapted to transmit and receive signals in two distinct frequency bands. In a preferred embodiment the antenna assembly is configured to operate in both the cellular frequency band, 800–900 MHz, and the PCS frequency band, 1800–2000 MHz. The antenna assembly is further configured to couple signals in either frequency band through the dielectric so that signals originating on a first side of the dielectric substrate may be coupled to the antenna-radiating element located on the opposite second side of the dielectric substrate and signals received by the antenna on the second side of the dielectric substrate may be coupled through the dielectric to a mobile telephone located on the first side of the substrate. Thus, signals originating from a mobile telephone unit located within a vehicle may be coupled to and transmitted by an antenna element on the outside of a vehicle, and signals received by the antenna may be coupled to the mobile telephone inside the vehicle.

An embodiment of a dual-band glass-mounted antenna assembly according to the present invention is shown in the exploded perspective views of FIGS. 1–4. The antenna assembly includes a coupler assembly 102 for mounting to a dielectric substrate such as an automobile window glass (not shown). However, the dielectric substrate may be a material other than an automobile window glass. For example, the dielectric substrate could be a pane glass window of a building, or could be a dielectric material other than glass. In any event, the coupler is adapted to be mounted to a first side of the substrate by means of a pressure sensitive adhesive (as described below) or other means. As will be described below, the coupler assembly is further configured to receive a coaxial cable (not shown) for carrying electromagnetic signals to and from the coupler assembly 102.

A base housing assembly 106 is provided for mounting on the second side of the dielectric substrate opposite the coupler assembly 102. The base housing assembly 106 is attached to the second surface of the dielectric substrate by means of a special pressure sensitive tape laminate as will be described below. The base housing assembly acts to pivotally support a dual-band whip antenna radiating element 108. The antenna radiating element includes a radiator rod 109 (FIG. 5) which, in a preferred embodiment, will be about 8¾ inches long and will be made of stainless steel about 0.090 inch in diameter. In a preferred embodiment, the dual-band whip antenna radiating element will be about 12½ inches long. The base housing assembly 106 and the coupler assembly 102 are configured to couple signals in both frequency bands in both directions through the dielectric substrate. Further, the whip antenna-radiating element 108 is adapted to efficiently transmit and receive electromagnetic signals in both frequency bands.

Coupling assembly 102 comprises a hollow rectangular case 110 formed of a conductive material. In a preferred embodiment, the case will be about 1.75×1.75×0.7 inches in size. A circular connector receiving aperture 111 is formed in a first side wall 113 of case 110. A pair of smaller apertures 115 are formed diametrically opposite one another on each side of the connector receiving aperture 111 for receiving fasteners mounting a coaxial cable connector 112 to the case 110. The coaxial connector 112 including a cylindrical barrel 117, a connector flange 114, and a center conductor connecting pin 116. A coaxial cable (not shown) may then be connected to the connector 112 to carry signals between the coupler assembly 102 and other components such as a mobile telephone unit located on the same side of the dielectric substrate 104 as the coupler assembly 102.

The coaxial connector is mounted to the coupler assembly by inserting in the barrel 117 through the connector receiving aperture 111 with the connector flange 114 abutting the inner surface of the first side wall 113 of case 110. Self tapping screws 118 may be threaded through the small apertures 115 on either side of the connector receiving aperture 111 to secure the connector 112 to the case 110.

A number of fastener receiving holes 119 are formed in the bottom surface 121 of the case 110. A single fastener receiving aperture 119 is located near each corner of the case, and a fifth fastener receiving aperture 122 is located off-center to one side of the coaxial connector 112. The off-center fastener receiving aperture is provided for mounting a three-dimensional microstrip matching circuit 140 shown in FIG. 3.

The matching circuit 140 acts to match the characteristic impedance of the coaxial cable, typically 50Ω, to the characteristic impedance of radiating element 108 at both frequency bands. In the preferred embodiment of the invention, wherein the dual-band glass antenna assembly is configured to operate in both the cellular 800–900 MHz frequency band and the 1.8 GHz PCS frequency band the matching circuit 140 (FIG. 3) comprises a single sheet of conductive material folded a manner creating a plurality of microstrip transmission line segments. In this preferred embodiment, the matching circuit 140 is formed from a single stamped sheet of ½ hard 260 alloy brass 0.02 inch thick. A first microstrip transmission line segment 142 defines an inner surface 141 and an outer surface 143. The first microstrip transmission line segment is bounded by first and second vertical edges 148 and 150, horizontal upper edge 144 and horizontal lower edge 146, as well as a is first 90° bend which joins first microstrip transmission line segment 142 to a second horizontal microstrip transmission line segment 154.

The second, horizontal, microstrip transmission line segment 154 defines an upper surface 155 and a lower surface 157 therebelow, and includes a slot 156 which divides the second microstrip transmission line segment 154 into first and second portions 158, 160. A first edge of slot 156 defines an inner edge 162 of the first portion of 158 of the second transmission line segment 154, and runs substantially parallel to an outer edge 166. The distal end of the first portion of the second microstrip transmission line segment is defined by a second 90 degree radial bend 172 which joins the first portion of the second microstrip transmission line segment to a third vertical microstrip transmission line segment 174. A second edge 151 of slot 156 defines an inner edge of the second portion 160 of the second transmission line segment 156, and runs substantially parallel to an outer edge 168. The distal end of the second portion 160 of the second microstrip transmission line signal 154 is bounded by the horizontal edge 170 which extends substantially perpendicular to the outer edge 168.

The third microstrip transmission line segment 174 is bounded by first and second vertical edges 176, 178, the second 90° bend between the first portion 158 of the second microstrip transmission line segment 154, and by a third 90° bend 180 between the third microstrip transmission line segment 174 and a fourth microstrip transmission line segment 182. The third microstrip transmission line segment 174 extends vertically, substantially parallel to the first micro transmission line segment 142 and defines inner and outer surfaces 175, 177, respectively.

Finally, the fourth transmission line segment 182 is bounded by first and second lateral edges 184, 186 and distal edge 188 which extend substantially parallel to the third 90° bend 180. Fourth microstrip transmission line segment 182 has a top surface 190 at a bottom surface 192. Segment 182 is folded back over the second microstrip transmission line segment 154 and extends substantially parallel thereto.

In order to efficiently operate the antenna assembly in the preferred frequency ranges, namely between 800 to 900 MHz, and at 1.8 GHz, the three-dimensional matching circuit 140 should be constructed in accordance with a number of critical dimensions. First, the distance between the upper surface of the second microstrip transmission line segment 154 and the upper edge 144 of the first microstrip transmission line segment is 0.375 inch. Next, the distance between the inner surface 141 of the first microstrip transmission line segment 142 and the inner surface 175 of the third microstrip transmission line segment 174 is 1.062 inch. The distance between the upper surface 155 of the second microstrip transmission line segment 154 and the lower surface 192 of the fourth microstrip transmission line segment 182 is 0.711 inch, and finally the distance from the inner surface 175 of the third microstrip transmission line segment 174 and the distal edge 188 of the fourth microstrip transmission line segment 182 is 0.510 inch.

Additional dimensions in keeping with the preferred embodiment of the invention include the 0.031 inch radius of the first second and third 90° bends 152, 172, and 180, the slot width dimension of 0.063 inch and the location of the slot relative to the outer edge 166, 168 of the second microstrip transmission line segment 154. The first edge 162 of the slot 156 is located 0.375 inch from the outer edge 168 of the second portion 160 of the second microstrip transmission line segment 154. Further, the second vertical edge 150 of the first microstrip transmission line segment 142 is coplanar with the outer edge 168 of the second portion 160 of the second microstrip transmission line segment 154, and the second portion of the second microstrip transmission line segment extends 1.031 inches from the inner surface 141 of the first microstrip transmission line segment 142. Finally, the first microstrip transmission line segment 142 extends horizontally 1.125 inches and vertically 0.375 inch. A connector pin receiving aperture 153 is formed in the first microstrip transmission line segment 142, horizontally centered between the first and second vertical edges 148, 150 and positioned 0.153 inch from the upper edge 144. A fastener receiving aperture 149 is formed in the second portion of the second microstrip transmission line segment 154 and is centered 0.45 inch from the distal edge 170 of the second portion 160 and 0.150 inch from the outer edge 168.

A foam dielectric pad 120 (FIG. 2) is adhered to the underside of the second surface 144 of the matching circuit 140. The foam pad (in a preferred embodiment about 0.080 in. thick) is aligned with the first 90° bend between the first microstrip transmission line segment 142 and the second microstrip transmission line segment 154. A hole is formed in the dielectric foam pad coincidentally with the fastener receiving aperture 196 formed in the second portion 160 of the second microstrip transmission line segment 154. The matching circuit is mounted within the hollow case 110 of the coupler assembly 102 by inserting the coaxial cable connector center conductor pin 116 into the connector pin receiving aperture 153 and aligning the fastener receiving aperture 149 formed in the second portion 160 of the second microstrip transmission line segment 144 with the off-center fastener receiving aperture 122 formed in the bottom surface 121 of the case 110. A short spacer 123 (in a preferred embodiment about 0.080 in. thick) may be provided between the lower surface of the case and the matching circuit 140, and a rivet 125 inserted through the faster receiving aperture to secure the matching 140 circuit within the case 110. The center conductor connector pin 116 may then be soldered to the first surface microstrip transmission line segment of the matching circuit 140.

Figure 2:
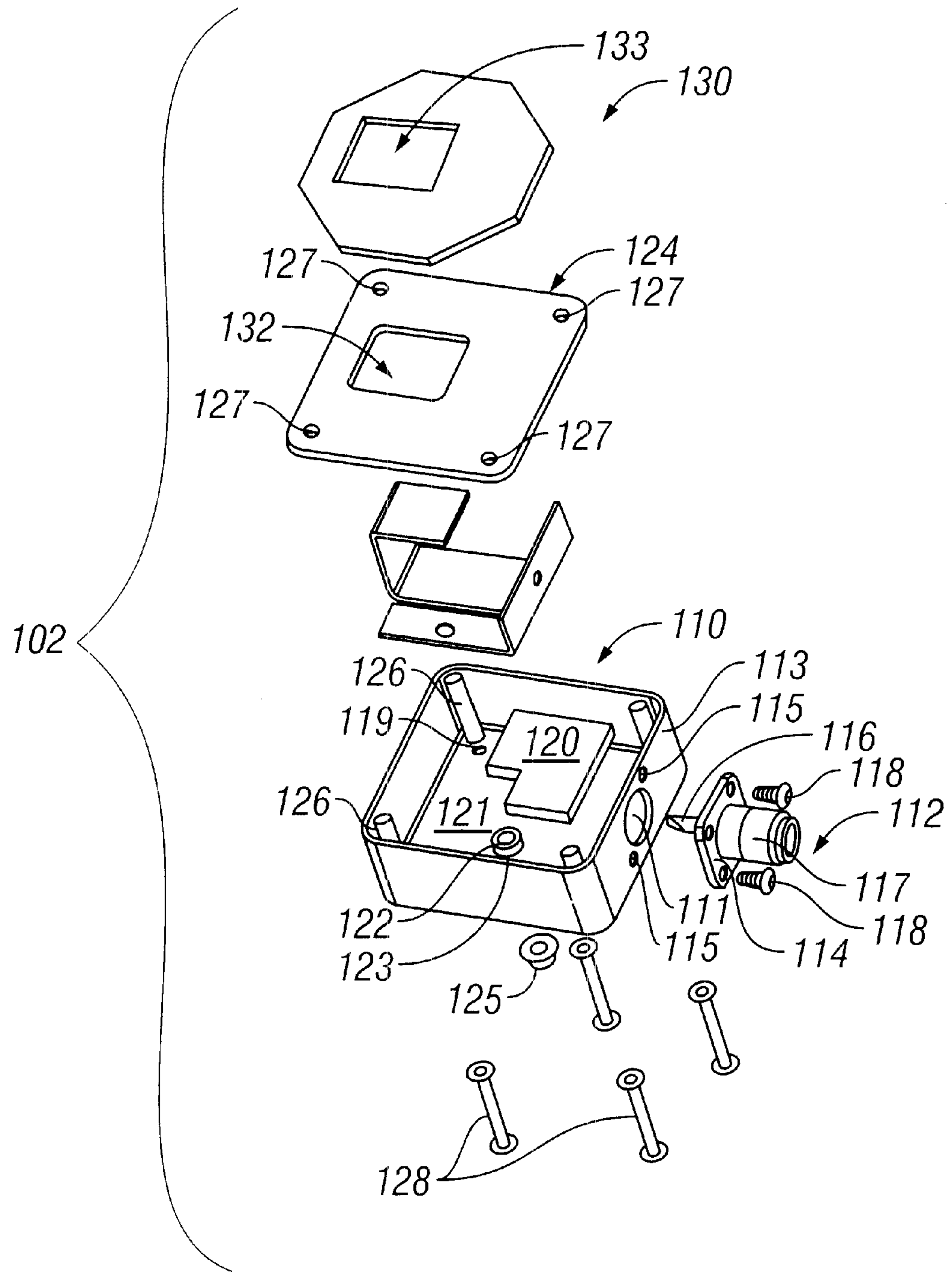
FIG. 2 is an exploded perspective view of the coupling assembly of the antenna of FIG. 1.
Figure 2A:
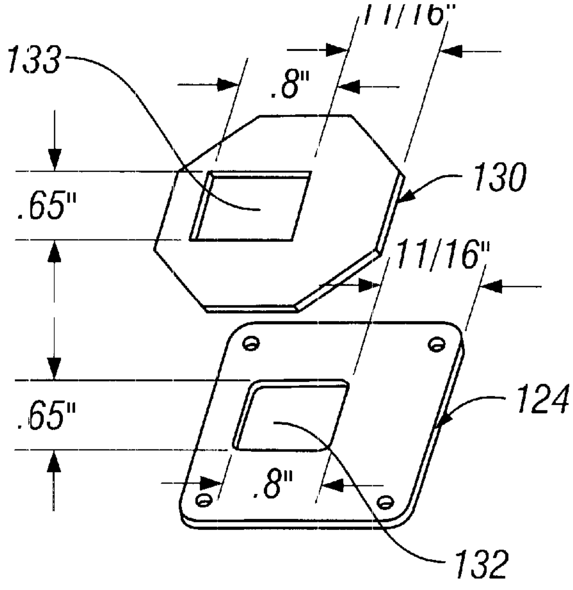
FIG. 2A is a view of the cover and foam tape of FIG. 2, showing preferred dimensions of these elements.
Figure 3:
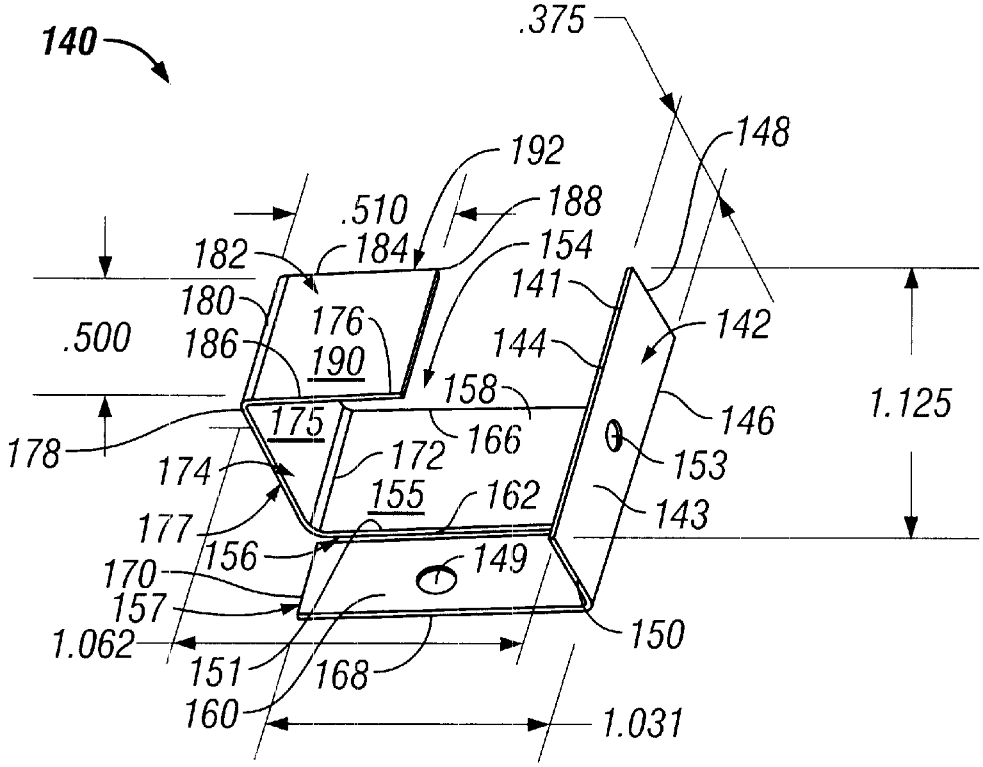
FIG. 3 is a perspective view of the matching circuit located in the coupling assembly of FIG. 2.

An epoxy board cover 124 (in a preferred embodiment about 1.77×1.77×0.0625 in. in size) is provided to enclose the coupler assembly 102. Spacer tubes 126 are provided at each of the faster receiving apertures 119 having substantially the same length as the depth of the case 110. The cover is placed over the open side of the case and riveted thereto using long rivets 128 inserted through the faster receiving apertures 119, case 110, spacer tubes 126, and corresponding fastener receiving apertures 127 formed in the cover 124. In a preferred embodiment of the invention, the dimensions of the cover will be as illustrated in FIG. 2A.

A rectangular window 132 is formed in the cover 124 allowing the fourth microstrip transmission line segment 182 of the matching circuit 140 to extend therethrough substantially parallel to the cover. Finally, a two-sided pressure sensitive foam tape 130 is applied to the cover 124. The foam tape 130 also includes a window 133 generally corresponding to the window 132 formed in the cover 124. Thus, the coupler assembly 102 may be mounted to the flat surface of a dielectric, such as the window glass of an automobile, by pressing the pressure sensitive tapes against the dielectric surface. In this configuration the top surface 190 of the fourth microstrip transmission line segment 182 of the matching circuit 140 is oriented substantially parallel to and adjacent the surface of the dielectric substrate. In a preferred embodiment of the invention, the dimensions of the two-sided pressure sensitive foam tape will be as illustrated in FIG. 2A. The preferred thickness of the two-sided pressure sensitive foam tape will be about 0.080 in.

Figure 4:
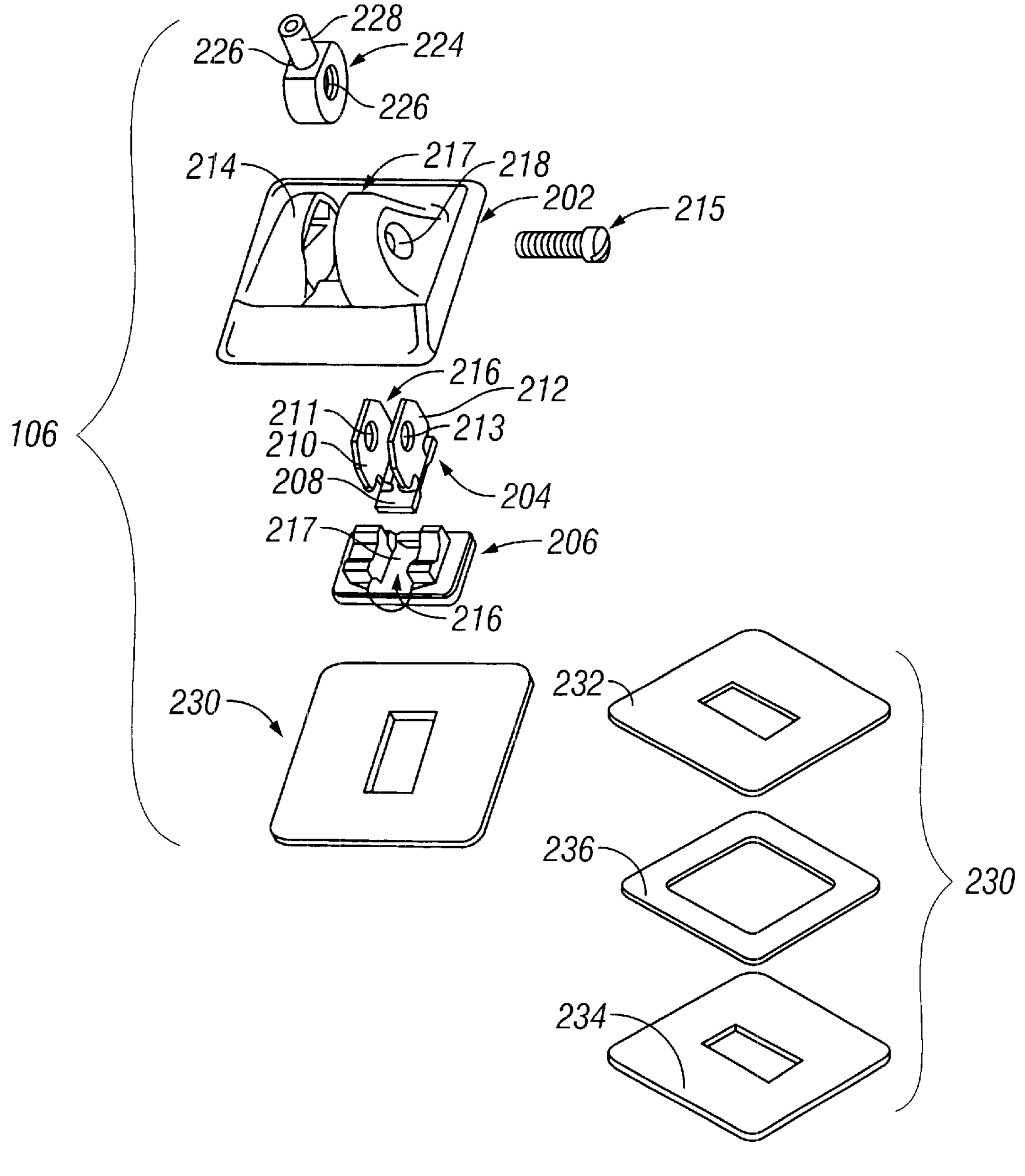
FIG. 4 is an exploded view of the base housing of the antenna of FIG. 1.

Turning now to FIG. 4, the base assembly 106 is shown comprising a base housing 202, a U-shaped conductive foot member 204, a retainer 206 (preferably plastic, 1×½ in.) and a swivel mounting member 224. The U-shaped conductive foot member 204 includes a substantially planar lower surface 208 and first and second vertical prongs 210, 212. A pair of axially aligned apertures 211, 213 are formed in the first and second vertical prongs for receiving a swivel mounting screw 215. The vertical prongs of the conductive foot 204 maybe inserted into a center slot 216 formed in the retainer 206. A short connecting bridge 217 extends between the two halves of the retainer 206 and overlaps a front portion of the lower flat surface 208 of the foot member 204.

The base housing 202 (preferably polyurethane and about 1¾×¾ in. in size) includes an upper portion which defines a slotted swivel housing 214. The swivel housing 214 defines a swivel slot 217 through the center of the housing. The swivel slot 217 is adapted to receive a swivel mounting member 224 which may be pivotally mounted within the swivel slot 217. A pair of slotted openings (not shown) are formed in the underside of the base housing and communicate with the interior of the swivel housing 214 and the swivel slot 217. The vertical prongs 210, 212 of the conductive foot 204 as well as the two halves of the retainer 206 may be inserted into the slotted openings on the bottom of the base housing with the two vertical prongs 210, 212 of the conductive foot 204 extending into the swivel housing on each side of the swivel slot 217. The swivel housing includes an axial bore 218 which aligns with the screw receiving apertures formed in the first and second vertical prongs of the conductive foot 204 when the foot 204 is inserted into the base housing. The mounting swivel member 224 is insertable into the swivel slot 216 between the two vertical prongs. The swivel member may then be pivotally secured within the swivel slot 216 by screw 215 inserted through axial bore 218 in the swivel housing 214 and threadably secured in a receiving aperture pre-formed in vertical prong 210 on the side of the swivel housing 214 opposite the axial bore 218.

Swivel 224 includes a threaded bore 226 holding a set screw 228, a portion of which protrudes from the surface of swivel 224. The antenna-radiating element 108, which will be described below, may be screened into the protruding portion of set screw 228. Thus, the antenna-radiating element 108 may be rotated about the center axis of the swivel in order to obtain a desired orientation relative to the surface of the dielectric material on which the base housing assembly 106 is mounted.

A foam adhesive laminate 230 is applied to the bottom of the base housing 202. The foam laminate comprises a first layer 232 of two sided pressure sensitive foam tape, a conductive foil layer 236, and a second layer of two sided pressure sensitive foam tape 234. The first layer of pressure sensitive foam tape 232 comprises a closed cell white acrylic foam with acrylic pressure sensitive adhesive on both sides. In a preferred embodiment, the first layer of foam tape 232 comprises VHB 4951 tape produced by 3M Corporation, and is about 0.045 in. thick, about 1<sup></sup>11⁄16×1 11⁄16 in. in size, and has an opening about ⅜×¾ in. The foil layer preferably comprises an aluminum foil sheet preferably 0.0035 in. thick having a 1 inch square cutout in the center. Finally, the third layer of the laminate preferably comprises a second layer of high-density closed sell white acrylic foam with acrylic pressure sensitive adhesive on both sides, preferably VHB 4920 tape, also manufactured by 3M Corporation, and is about 0.015 in, thick with the same outer size and center opening as foam tape layer 232. A rectangular cut out is removed from the center of the laminate 230 to accommodate the lower flat portion of the foot 204 protruding slightly from the bottom surface of the base housing 202.

The base housing assembly 106 is mounted to a dielectric substrate directly opposite coupler assembly 102. In this orientation, the lower flat surface 208 of the foot 204 is located substantially parallel to and directly opposite the fourth surface 182 of the matching circuit 140. Together, the lower flat surface 208 of the foot 204, the foil layer within the laminate 230, and the fourth surface 182 of the matching circuit 140 act to capacitively couple signals across the dielectric substrate 104.

The dual-band antenna assembly is able to accommodate signals in both the cellular and PCS frequency ranges due to the matching circuit 140 and the conductive window formed by the foil layer embedded within the foam tape laminate on the bottom of the exterior base housing 202. The planar transmission lines of the matching circuit 140 of the matching circuit 140 transform the unbalanced 50 Ohm characteristic impedance of the coaxial feed cable, to a balanced feed via the counterpoise effect of the interior coupler and the electrical coupling means to the antenna radiators. The microstrip dielectric consists mostly of air with the hi-density acrylic foam pad 120 critically positioned to augment dielectric loading and mechanical restraints within the second microstrip plane. The fourth microstrip transmission line segment 182 of the matching circuit folds back inwardly away from the grounded circuit plane to form a launch surface for coupling, via the conductive window frame, with the exterior coupler.

At the upper end of the PCS frequency band, the conductive window frame formed by the aluminum foil layer embedded within the adhesive foam laminate acts as an exterior mounted electrically coupled extension of the interior coupler assembly. The window frame efficiently couples the upper sub-band of the PCS frequency band to conductive foot 208 at the base of the base housing assembly 106. If the conductive frame is absent, the higher frequency signals leak past the exterior coupler, greatly increasing the signal current necessary to excite the radiator. An advantage of the conductive window design is that the conductive window is electrically coupled to both the interior and exterior portions of the assembly without direct physical contact with either. The size, shape and location of the window frame are critical to achieve the required VSWR bandwidth and optimal performance. The conductive window must be located on the base housing assembly side of the substrate and must be sufficiently flexible to accommodate various degrees of curvature of the dielectric substrate.

Figure 5:
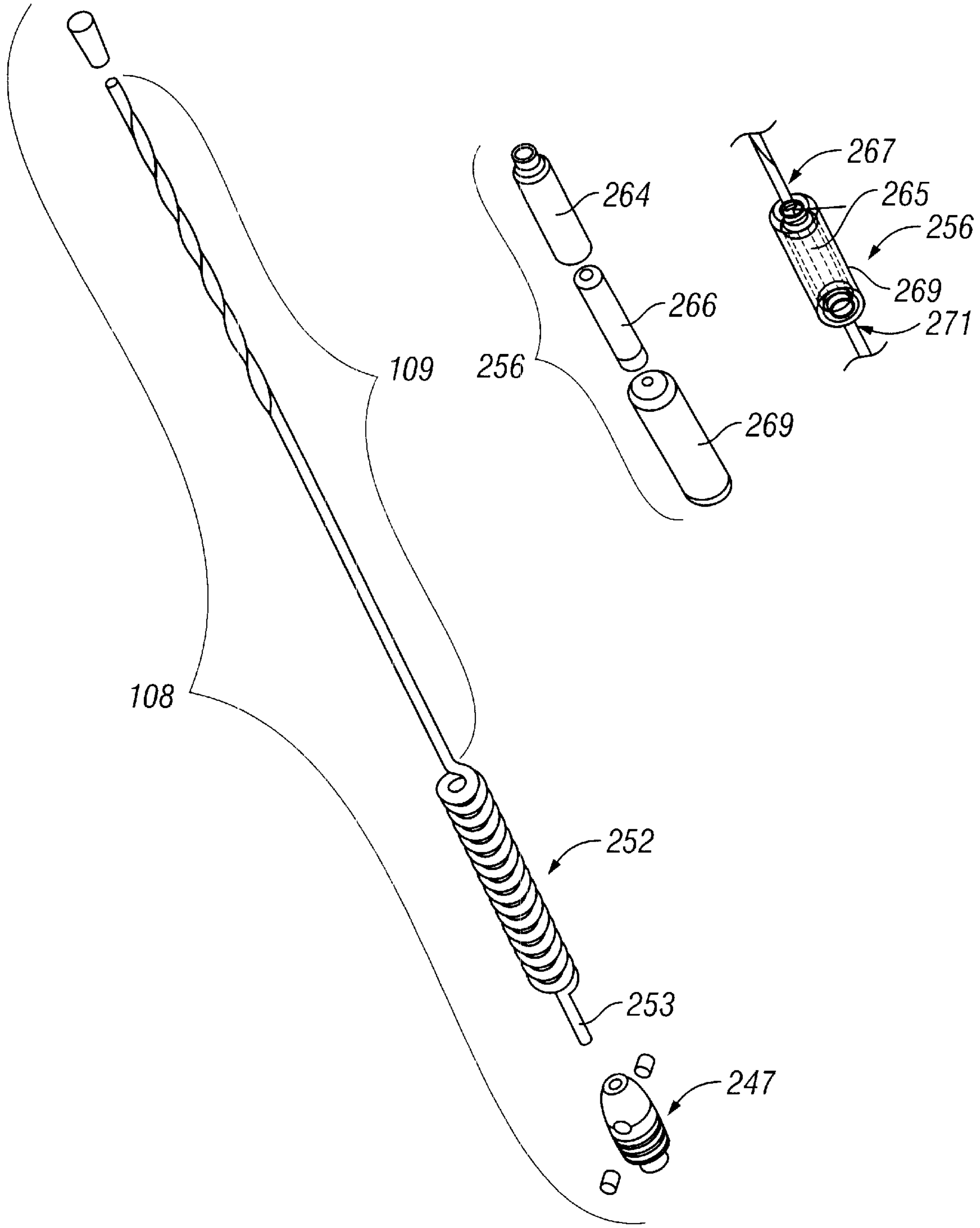
FIG. 5 is an exploded view of the antenna radiating element of the antenna of FIG. 1.

Finally, as shown in FIGS. 1 and 5, antenna 108 comprises a whip adapter 247 (preferably made of brass, and about 1 in. in length) comprising part of the lower radiating section 250 of the antenna, a phasing coil 252, a middle whip radiator 254, a choke assembly 256, and an upper whip radiating section 258. In a preferred embodiment, the phasing coil will be about 3 in. in length and will comprise a coil with 16 turns, having a ⅜ in. O.D. Also, in the preferred embodiment, a stub 253 (preferably about ¾ in. long) is provided to fit within whip adapter 247. In a preferred embodiment, the middle whip radiator will be about 2.125 in. long, and the upper whip radiating section will be about 5.5 in. long.

The PCS band choke assembly 256 comprises a cylindrical PCS choke sleeve 264 positioned radially from an inner conductor portion 265 of the lower whip radiator 254. In a preferred embodiment, the will be made of brass, with a 0.28 in. O.D. and a 0.218 in. I.D., and a length of about 1¼ inches. A dielectric filler 266 is provided between the PCS choke sleeve 264 and the inner portion. In a preferred embodiment, the dielectric filter will be made of Teflon, and will have an O.D. of about 0.22 inch and a length of about 1.05 inches. The upper end of the PCS choke sleeve 264 is shorted to the center conductor at 267. The choke sleeve and dielectric are encased in a cylindrical outer protective polypropylene cover 269. In a preferred embodiment, the cylindrical outer protective polypropylene cover will have an O.D. of about ⅜ inch and a length of about 1 7/16 inches. The PCS band choke assembly 256 forms a shorted transmission line having an effective electrical length of ¼ wavelength at PCS frequencies. The PCS band choke assembly 256 effectively eliminates any current flow beyond the base of the PCS choke sleeve 256 at PCS frequencies. Thus, at PCS frequencies, the radiating section above phasing coil 252 is approximately one half wavelength. At cellular frequencies, the PCS band choke assembly 256 has little effect, and therefore, the entire assembly above phasing coil 252 forms a half-wavelength radiator. Other configurations for the PCS choke assembly could also be used. For example, the PCS choke assembly could be implemented using a choke coil, which would minimize currents on the upper radiator at PCS frequencies.

The lower radiating section 250 of antenna 108 has an electrical length on the order of one half wavelength at PCS frequencies. Therefore, the base of the radiator 250 presents a relatively high impedance, on the order of 500 ohms, at PCS frequencies. Thus, the antenna matching section operates at PCS frequencies to improve the antenna's VSWR, which would otherwise be undesirably high. In the cellular band, antenna 108 has an electrical length of approximately one-quarter wavelength, and therefore the base of the radiator presents a characteristic impedance on the order of 30–40Ω. At cellular frequencies, the antenna matching circuit 140 provides a relatively small transformation of the impedance presented by the base of the radiator, resulting in an improved impedance response approaching 50Ω.

Figure 6:
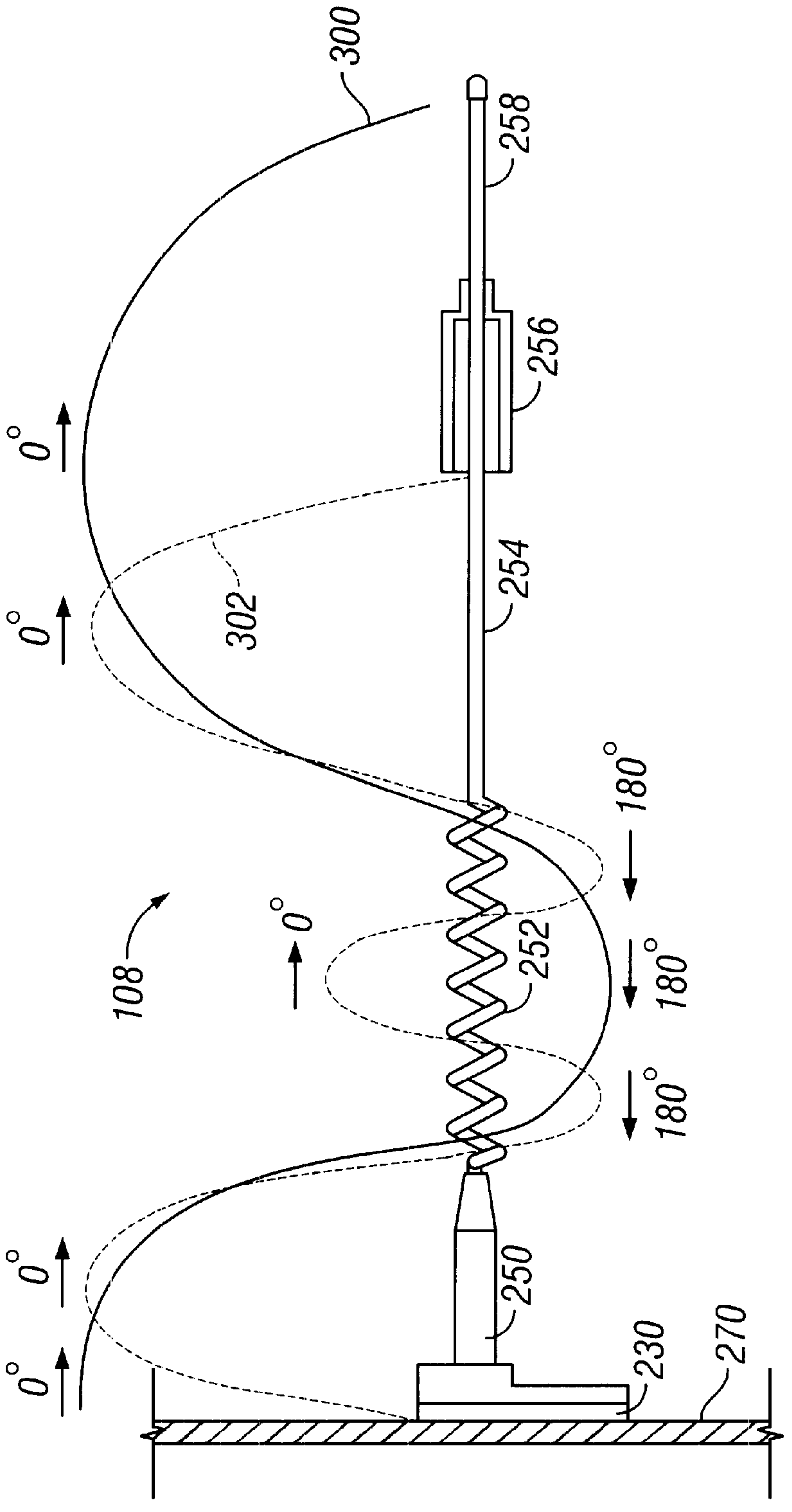
FIG. 6 is a diagram showing the relative amplitudes and phase of the current distribution along the radiator element of FIG. 1, at cellular and PCS frequencies, as determined from current probe measurements.

Phasing coil 252 achieves an in-phase condition between the upper and lower co-linear radiators 250 and 254 at both cellular and PCS frequency ranges. FIG. 6 is a diagramatic representation of the relative amplitudes and phase of the current distribution along the dual-band antenna/radiator element 108 (mounted on automobile window glass 270) at cellular and PCS frequencies as determined from current probe measurements, using a network analyzer. The current distribution at cellular frequencies is represented by solid line 300. The current distribution at PCS frequencies is represented by broken line 302.

At cellular frequencies, maximum current occurs at the base of the lower radiator 250 and at the center of the assembly comprising middle radiator 254, PCS choke assembly 256, and upper radiator 258. Two maximum current regions are "in-phase", as shown by the direction of the upward pointing arrows. In the region of the phasing coil 252, the current is "out-of-phase" with respect to the maximum current regions, as shown by the downward-pointing arrow. Although measurable with a current probe, the current in the region of phasing coil 252 is effectively non-radiating, and therefore this current does not affect the radiation characteristics of the antenna. Antenna pattern measurements have shown that at cellular frequencies, this radiation configuration exhibits an omni-directional radiation pattern, with an E-plane beam width on the order of 37°, which is consistent with that expected of a two element collinear array.

At PCS frequencies, maximum current occurs at the center of the lower radiator and at the center of the middle radiator 254 between the top of phasing coil 252 and the open end 271 of the PCS choke sleeve 264. The two maximum current regions are "in phase", as depicted by the direction of the upward pointing arrows. In the region of the phasing coil 252, current probe measurements show that secondary current peaks occur. Two of the peaks are "out-of-phase" with the primary maximum current regions, while one of the peaks is in phase. The symmetry of the second current in the region of the phasing coil 252 is believed to be a requirement in order to achieve "in-phase" radiation characteristics for the two element collinear formed by dual-band antenna/radiator element 108. Since the secondary current in the region of the phasing coil 252 is effectively non-radiating, the radiation characteristics of the antenna are not affected. Antenna pattern measurements have shown that at PCS frequencies, this radiator configuration exhibits an omni-directional radiation pattern, with an E-plane beam width on the order of 31°, which is consistent with that expected of a two element collinear array.

Although not entirely understood, the pitch, number of turns, wire diameter, and coil diameter of the phasing coil 252 seem to be important parameters in achieving proper phasing in both cellular and PCS frequency ranges.

The antenna/radiator element 108 described above is one which advantageously provides approximately 2–3 dB of gain over a dipole, or 4–5 dB gain over an isotropic radiator element. However, other types of radiators could be used. In particular, a simple linear whip radiator of appropriate length may also be used with coupler 110 to present an impedance equivalent to the radiator 108 described below. For example, a suitable radiator could be constructed in a manner similar to that described for the radiator 108, but omitting the phasing coil and all the components above that. The resulting radiator is, in essence, a whip radiator having a length of 3 inches, which is capable of operation in both Cellular and PCS bands. The whip radiator is on the order of a ¼ wavelength at cellular frequencies and on the order of ½ wavelength at PCS frequencies. Such a short radiator will exhibit 0 dB gain referenced to a dipole radiator.

It should be understood that various changes and modifications to the preferred embodiments described herein will be apparent to those skilled in the art. Such changes and modifications can be made without departing from the spirit and scope of the present invention and without diminishing its attendant advantages. It is therefore, intended that such changes and modifications be covered by the following claims.

What is claimed is:

1. A dual-band antenna assembly for use in conjunction with a dielectric substrate, the assembly operable in two distinct frequency bands greater than 800 MHz, the dual band antenna assembly comprising:

a coupler assembly configured to be mounted on a first side of the dielectric substrate, the coupler assembly including a connector to which a transmission medium may be connected to carry electromagnetic signals to and from the coupler assembly;

a base housing assembly configured to be mounted on the second side of the dielectric substrate, the base housing assembly supporting a dual-band antenna radiating element;

a first coupling element associated with the coupler assembly and a second coupling element associated with the base housing whereby electromagnetic signals in the two distinct frequency bands maybe coupled between the coupling assembly and the base housing through the electric substrate; and a conductive window frame associated with the base housing electrically insulated from the second coupling element and located as a counterpoise and a capacitively-coupled extension of the first coupling element between said first and second coupling elements when said coupler assembly and said base housing assembly are mounted on the substrate for coupling the two distinct frequency bands.

2. The dual-band antenna assembly of claim 1 further comprising an adhesive laminate for mounting the base housing assembly to the substrate, said conductive frame being embedded within said laminate.

3. The dual-band antenna assembly of claim 2 wherein said adhesive laminate comprises a first layer of pressure sensitive foam tape and a second layer of pressure sensitive foam tape, and said conductive frame comprises a thin aluminum foil layer disposed between said first and second layers of pressure sensitive foam tape.

4. The dual-band antenna assembly of claim 1 further comprising a matching circuit associated with the coupler assembly configured to match the impedance of the transmission medium connected to the coupler assembly with the impedance of the radiating element at both of the two distinct frequency bands.

5. The dual-band antenna assembly of claim 4 wherein said matching circuit comprises a three-dimensional air dielectric slotted microstrip transmission line circuit.

6. The dual-band antenna assembly of claim 5 wherein said matching circuit includes a first coupling surface oriented substantially parallel the first surface of the dielectric substrate when the coupler assembly is mounted thereon.

7. A through dielectric coupler adapted for use in conjunction with a dielectric material having a first surface and a second surface, the coupler comprising:

a first coupler assembly adapted for non-penetrating application to the first surface;

a second coupler assembly adapted for non-penetrating application to the second surface;

said first and second coupler assemblies each having a connection port for receiving a transmission medium whereby electromagnetic signals of two distinct frequency bands greater than 800 MHz and separated by a ratio of approximately 2:1 may be carried to and transmitted from each coupler assembly;

each coupler assembly further comprising a coupling plate for coupling the electromagnetic signals through the dielectric material when said first and second coupler assemblies are mounted opposite one another across the dielectric;

the first coupler assembly including a matching circuit for matching the characteristic impedance of the transmission medium connected to the connection port associated with the first coupler assembly to the load impedance presented by the second coupler assembly at each of the distinct frequency bands; and a conductive window frame associated with said second coupler assembly electrically isolated from the coupling plate of said second coupler assembly and positioned as a counterpoise and a capacitively-coupled extension of the first coupler assembly between coupling plates of each of the first and second coupler assemblies when the coupler assemblies are mounted on the dielectric material for coupling the two distinct frequency bands.

8. The through dielectric coupler of claim 7 wherein the connection port of the second coupler assembly is adapted to electrically connect to a dual-band antenna radiating element configured to operate in the two distinct frequency bands.

9. The through dielectric coupler of claim 7 further comprising an adhesive laminate for mounting the second coupler assembly to the second surface of the dielectric, said conductive window frame being embedded within the adhesive laminate.

10. The through dielectric coupler of claim 9 wherein said conductive window frame comprises a layer of aluminum foil.

11. The through dielectric coupler of claim 9 wherein said conductive window comprises an approximately 0.0035 inch thick aluminum foil square approximately 1.55 inches per side, having a 1 inch square cut out from the center thereof.

12. The through dielectric coupler of claim 9 wherein said conductive window comprises a conductive case and the matching circuit comprises a three-dimensional slotted microstrip transmission line circuit integrally formed with the coupling plate associated with the first coupler assembly mounted therein.

13. The through dielectric coupler of claim 12 wherein the first coupler assembly further comprises a dielectric cover having a two-sided adhesive thereon for mounting the first coupler assembly to the first surface of the dielectric material, said cover and said two-sided adhesive having a hole formed therein such that the coupling plate integrally formed with the matching circuit extends substantially parallel and adjacent to the first surface of the dielectric material.

14. The through dielectric coupler of claim 12 wherein said two distinct frequency bands comprise the cellular frequency band and the PCS frequency band.

15. A dual-band on-glass antenna assembly comprising a first coupler assembly adapted to be mounted on a first surface of a glass substrate, the first coupler assembly comprising a conductive shell having a coaxial cable connector mounted thereon, a three-dimensional slotted microstrip transmission line matching circuit mounted within the conductive shell, a first coupler plate integrally formed with the matching circuit, a dielectric cover enclosing the shell, and a foam adhesive tape affixed to the cover for mounting the first coupler assembly to the glass substrate;

a second coupler assembly adapted to be mounted on a separate surface of the glass substrate, the second coupler assembly comprising a base, a second coupling plate disposed on a bottom surface of the base, a two-sided adhesive laminate including a conductive window frame adhered to the base for mounting the second coupler to the second surface of the glass substrate in a position opposite the first coupler assembly, the conductive window frame being disposed between the first and second coupling plates, and an adjustable mount for pivotally supporting an antenna radiating element and electrically connecting the second coupling plate to the radiating element; and a dual-band radiating element comprising a base for attaching the radiating element to the adjustable mount, a phasing coil, a first radiating member, a capacitive choke assembly, and a second radiating member.

* * * * *